(12) United States Patent
Fruth

(10) Patent No.: US 10,118,344 B2
(45) Date of Patent: Nov. 6, 2018

(54) TOOL HEAD

(71) Applicant: FIT AG, Parsberg (DE)

(72) Inventor: Carl Fruth, Parsberg (DE)

(73) Assignee: FIT AG, Lupburg (DE)

( * ) Notice: Subject to any disclaimer, the term of this patent is extended or adjusted under 35 U.S.C. 154(b) by 419 days.

(21) Appl. No.: 14/784,839

(22) PCT Filed: Apr. 8, 2014

(86) PCT No.: PCT/EP2014/000934
§ 371 (c)(1),
(2) Date: Oct. 15, 2015

(87) PCT Pub. No.: WO2014/169995
PCT Pub. Date: Oct. 23, 2014

(65) Prior Publication Data
US 2016/0052206 A1    Feb. 25, 2016

(30) Foreign Application Priority Data

Apr. 19, 2013 (DE) .................. 10 2013 103 973

(51) Int. Cl.
| | |
|---|---|
| *B29C 64/209* | (2017.01) |
| *B29C 64/241* | (2017.01) |
| *B29C 64/343* | (2017.01) |
| *B29C 67/00* | (2017.01) |
| *B29C 64/227* | (2017.01) |
| *B29C 31/04* | (2006.01) |
| *B33Y 30/00* | (2015.01) |

(52) U.S. Cl.
CPC ........ *B29C 67/0085* (2013.01); *B29C 31/042* (2013.01); *B29C 64/209* (2017.08); *B29C 64/227* (2017.08); *B29C 64/241* (2017.08); *B29C 64/343* (2017.08); *B29C 67/0055* (2013.01); *B33Y 30/00* (2014.12)

(58) Field of Classification Search
CPC ..... B29C 31/042; B29C 64/00; B29C 64/106; B29C 64/118; B29C 64/20; B29C 64/209; B29C 64/227; B29C 64/241; B29C 64/343; B29C 64/386; B29C 64/393; B33Y 30/00; B33Y 50/00; B33Y 50/02
See application file for complete search history.

(56) References Cited

U.S. PATENT DOCUMENTS

| | | |
|---|---|---|
| 7,625,200 B2 | 12/2009 | Leavitt |
| 2007/0228590 A1 | 10/2007 | Labossiere et al. |
| 2012/0189729 A1 | 7/2012 | Pax |
| 2017/0190109 A1* | 7/2017 | Holland ................ B29C 64/209 |

* cited by examiner

*Primary Examiner* — Yogendra N Gupta
*Assistant Examiner* — Joseph S Leyson
(74) *Attorney, Agent, or Firm* — Laurence A. Greenberg; Werner H. Stemer; Ralph E. Locher

(57) ABSTRACT

A tool head for use in a 3D printer includes at least two drivable tools, at least one of which is an extruder tool for melting a modeling material suitable for building an object in layers. A shared or common drive system for the at least two drivable tools serves, in the context of the at least one extruder tool, to feed the modeling material into an extrusion unit. A selection device can establish an operative connection between at least one tool selected from the number of drivable tools and the drive system.

8 Claims, 4 Drawing Sheets

TOOL HEAD

CROSS-REFERENCE TO RELATED APPLICATION

This application is a U.S. National Stage under 35 U.S.C. § 371 of copending International Application PCT/EP2014/000934, filed Apr. 8, 2014, which designated the United States; this application also claims the priority, under 35 U.S.C. § 119, of German Patent Application DE 10 2013 103 973.1, filed Apr. 19, 2013; the prior applications are herewith incorporated by reference in their entirety.

BACKGROUND OF THE INVENTION

Field of the Invention

The invention relates to a tool head for use in an apparatus for manufacturing a three-dimensional object by melt layering. The invention furthermore relates to an apparatus for manufacturing a three-dimensional object by melt layering, having a tool head of this kind.

A production method referred to as "fused deposition modeling" (FDM) or "melt layering" is known from the rapid prototyping sector. In this, a three-dimensional object is built up in layers using a meltable modeling material (build material), usually a plastic. Corresponding apparatuses are also referred to as "3D printers."

In the method, the modeling material is liquefied by heating and is deposited in layers onto a build platform with the aid of an extruder unit unrestrictedly movable in a manufacturing plane in an X-Y direction. The build platform is lowered in the Z direction in accordance with the applied layer thickness. Once the modeling material has been extruded, it cools and solidifies, and the individual layers become joined to form the desired three-dimensional object.

The modeling material used is generally present in solid form, usually in the form of a filament strand. The modeling filament is present as a rule in coil form. In this case it is of arbitrary length, wound onto a spool, and continuously delivered from there to the 3D printer. Alternatively, the modeling filament is present in the form of short bars or rods that are delivered sequentially to the 3D printer. Delivery of the modeling material to the extruder unit is accomplished in both cases with the aid of drivable feed elements, for example transport rollers, gears, or the like gripping on opposite sides of the filament.

Conventional 3D printers have hitherto for the most part used printing heads (tool heads) having only a single extruder tool. For various reasons, for example when more than one modeling material is to be processed in order to build an object, it is advantageous if the 3D printer comprises a tool head having multiple extruder tools.

For example, the first extruder tool can melt a first modeling material, and a second extruder tool can melt a second modeling material different from the first material. If the first modeling material is used for the actual object, the second modeling material can serve, for example, to construct supporting structures that can easily be removed again after the object has cured. Because changing of the extruder tool, or of the entire tool head, is eliminated, the total build time required for construction of the object becomes shorter when multiple extruder tools are used. Tool heads having multiple extruder tools are known.

The known tool heads having multiple extruder tools are disadvantageous in that each extruder tool comprises a separate drive system, usually in the form of a small electric motor, in order to drive the feed elements. As a result, the known tool heads having multiple extruder tools are comparatively large, heavy, physically complex, and expensive.

BRIEF SUMMARY OF THE INVENTION

An object of the present invention is to furnish a more economical apparatus for manufacturing a three-dimensional object by melt layering. This object is achieved by a tool head as described below and an apparatus as described below. Advantageous embodiments of the invention are described in the dependent claims.

The tool head according to the present invention for use in an apparatus for manufacturing a three-dimensional object by melt layering is characterized by at least two drivable tools, at least one of which is an extruder tool for melting a modeling material suitable for building the object in layers; by a shared drive system for the at least two drivable tools, the drive system serving, in the context of the at least one extruder tool, to feed the modeling material into an extrusion unit; and by a selection device with which an operative connection is establishable between at least one tool selected from the number of drivable tools and the drive system.

The invention creates an apparatus for manufacturing a three-dimensional object by melt layering, which apparatus can be manufactured more economically as compared with conventional apparatuses. The tool head is, as a result, smaller, lighter, of simpler construction, and cheaper to manufacture as compared with tool heads known from the existing art.

A central idea of the invention is to use, for the tool head, only one shared drive system that is usable for all drivable tools. A selection device serves to establish the operative connection required at the time between drive system and tool. The nature of the tools used in the tool head is not defined. Typically at least one of the tools is an extruder tool for melting a modeling material suitable for building the object in layers. In this case the drive system serves to feed the modeling material into the extruder unit. Further drivable tools of the tool head can be, for example, a milling cutter or another tool for material processing.

A further advantage is that the selection device is configurable both so that it establishes the operative connection individually for each drivable tool, and so that it establishes the operative connection simultaneously for multiple drivable tools. As a result of the manner in which the selection device is constructed, the number of connectable tools is not limited, for example, to only two tools. With the present invention three, four, or five tools can instead be driven by one and the same drive system.

If at least two extruder tools are provided, the selection device is then preferably embodied at least to establish the operative connection between a selectable extruder tool and the drive system. The result is that multiple extruder tools can be driven selectably, so that different modeling materials can be melted without changing the extruder tool or the entire tool head. Typically the different modeling materials are melted sequentially.

In an advantageous embodiment of the invention the selection device is embodied in such a way that two or more extruder tools are driven simultaneously. Two or more modeling materials can then be melted simultaneously. Manufacture of the object is then not limited by exclusively alternating delivery of modeling material.

If the drive system comprises a drive shaft driven by a motor, this drive shaft is then couplable in a defined manner to all drivable tools. Tool selection occurs simultaneously during or as a result of coupling, i.e. establishment of the operative connection to the drive system. Since one drivable tool is advantageously always coupled, a new tool selection is always synonymous with a tool change. An extruder tool change is necessary, for example, when multiple modeling materials are to be used sequentially within one build layer.

An embodiment of the invention that has proven very particularly advantageous for establishing the operative connection to the drive system is one in which that at least one drivable tool which is to be brought into an operative connection with the drive system is transferable from an idle position in which the tool is not operatively connected to the drive system into a working position in which the tool is operatively connected to the drive system, and for that purpose is movable relative to the drive shaft. The selection device is then embodied to move that tool relative to the drive shaft in order to establish the operative connection between that at least one tool and the drive system.

Because the tool is always moved as a unit with this embodiment of the invention, an automatic consequence is that only the respectively selected drivable tools are located in their working position, and all other drivable tools of the tool head are located in their idle position above the working plane. In an embodiment of the invention only one single drivable tool is ever selected, and therefore only one single drivable tool is ever located in the working position. In another embodiment of the invention, the multiple driving capability furnished by the invention is utilized so that multiple tools are selected simultaneously and are therefore located in the working position.

In a variant of these embodiments it is not the entire tool but instead only a drive element of that tool, for example in the case of an extruder tool a transport roller or a gear that serves to feed the modeling material, that is transferred from an idle position in which the drive element of the tool is not operatively connected to the drive system into a working position in which the drive element of the tool is operatively connected to the drive system, and for that purpose is moved relative to the drive shaft, in order to establish the operative connection between that drive element of the tool and the drive system. A prerequisite for this is of course that the drive element be correspondingly transferable from one position to another, and movable relative to the drive shaft. In this embodiment the location of the tool does not obligatorily change upon establishment of the operative connection to the drive system, so that assurance that all the tools not required are located above the working plane is provided in another suitable manner.

Alternatively or in addition to the two advantageous variants just described, in which the tool together with a drive element of the tool, or only that drive element, is movable relative to the drive shaft, further variants are possible that are of somewhat more complex design but are nevertheless advantageous, in which the drive shaft is movable, and is transferable from an idle position in which it is not operatively connected to the at least one tool that is to be brought into an operative connection with the drive system, or to the drive element of that tool, into a working position in which it is operatively connected to that tool or to the drive element of that tool. The selection device is then embodied to move the drive shaft relative to the drive element of that tool, or relative to that tool, in order to establish the operative connection between that at least one tool and the drive system. Here as well, assurance is provided via suitable measures that all tools not required are located above the working plane.

The at least one drivable tool that is to be brought into an operative connection with the drive can be transferable in various ways from the one position into the other position. In an embodiment of the invention which is of particularly simple design and therefore has little fault susceptibility, the at least one drivable tool is pivotable around a pivot shaft, advantageously inherent in the tool, which is preferably arranged immovably on the tool head.

The design can be further simplified if the at least one drivable tool is embodied to be deflectable by way of an elastic flexural deformation from one of the positions into the other position. A suitable tool part, in particular a housing element or frame element of the tool, is flexurally elastically deformable for this purpose. The tool or the tool part is advantageously connected immovably to the tool head at at least one holding point. A pivot shaft optionally equipped with a bearing, as in the embodiment described above, is then not necessary.

Selection of the desired drivable tools for which an operative connection to the shared drive system is to be established can be accomplished in various ways. An embodiment of the invention that has proven to be very particularly suitable is one in which the selection device encompasses a rotatable camshaft having a number of control cams. Each control cam serves, upon a rotation of the camshaft, to transfer at least one drivable tool from its idle position into its working position and/or from its working position into its idle position. Preferably each control cam is associated with exactly one tool.

It is particularly advantageous in this context if a selector wheel, connected to the camshaft and equipped with indentations, is provided. Preferably this selector wheel is actuatable by means of an actuation element in such a way that a defined engaging motion of the actuation element into the indentations of the selector wheel causes the camshaft to rotate through a defined rotation angle in order to perform a selection of one or more tools.

The apparatus for manufacturing a three-dimensional object comprises for this purpose an actuation element for actuating the selector wheel. With the aid of a tool head drive system, which is provided in any case in order to displace the tool head in the manufacturing plane during layer building, the tool head is moved against the stationary actuation element, mounted for example on a housing part or frame part of the apparatus, in such a way that the actuation element engages into one of the indentations of the selector wheel and, by way of a defined engagement motion, rotates the camshaft through a defined rotation angle. Each engagement motion thus causes the camshaft to rotate through a specific rotation angle depending on the specific embodiment of the selector wheel. Depending on the initial position of the camshaft, and depending on which rotational position of the camshaft is desired for selection of a drivable tool, either a single engagement motion is sufficient or several engagement motions are needed in order to bring about the desired position of the control cams. The tool head is then displaced against the stationary actuation element repeatedly, in accordance with the required number of engagement motions. In an alternative variant, the actuation element is embodied movably and is displaced correspondingly against the tool head that is stationary in a suitable position, in order to effect the desired rotation of the camshaft. Alternatively thereto, the camshaft can also be driven in motorized fashion and controlled accordingly; a selector wheel and an actuation element are then not required.

If only one single drivable tool is ever to be active, i.e. to be operatively connected to the drive system, then a tool change ensures that the first tool, previously coupled and located in its working position, is transferred into its idle position, while the new, second tool is transferred into its working position. Transfer of the (no longer active) first tool into its idle position can be accomplished in a variety of ways. In an embodiment of the invention, return elements are provided which automatically transfer the tool into its idle position as soon as the operative connection to the drive system is disconnected. The return elements are, for example, spring elements acting on the tool which are under stress with the tool in the working position and cause the tool to be returned to its idle position. In another embodiment, transfer of the tool into its idle position is accomplished upon a rotation of the camshaft through a defined rotation angle with the aid of correspondingly provided control cams of the camshaft. In a further embodiment of the invention in which a tool having at least one elastically flexible tool part is used, transfer of the tool into its idle position is accomplished by the fact that an automatic deformation of the tool or of the tool part back into the initial shape occurs. The above-described options for transferring a tool back into its idle position are correspondingly applicable in cases in which two or more drivable tools are to be activated simultaneously, while other tools are to be deactivated or decoupled.

If the drive system comprises a drive shaft driven by a motor, that drive shaft is couplable in a defined manner to all drivable tools. Tool selection occurs simultaneously during or as a result of coupling, i.e. establishment of the operative connection to the drive system. Since one drivable tool is advantageously always coupled, a new tool selection is always synonymous with a tool change. An extruder tool change is necessary, for example, when multiple modeling materials are to be used sequentially within one build layer.

In a further embodiment of the invention the tool head comprises, in addition to the at least one drivable tool, at least one tool not drivable by the drive system, a sensor, or the like, and the selection device is embodied to transfer this nondrivable tool, sensor, or the like from an idle position into a working position and/or from a working position into an idle position. This is accomplished either simultaneously with the establishment of an operative connection between the at least one drivable tool and the drive system, or also independently thereof. For example, the sensor can be a measurement sensor for measuring the build platform or the layers already applied, or for ascertaining a zero position.

BRIEF DESCRIPTION OF THE SEVERAL VIEWS OF THE DRAWING

An exemplifying embodiment of the invention will be explained in further detail below with reference to the drawings, in which.

DESCRIPTION OF THE INVENTION

Figure 1:
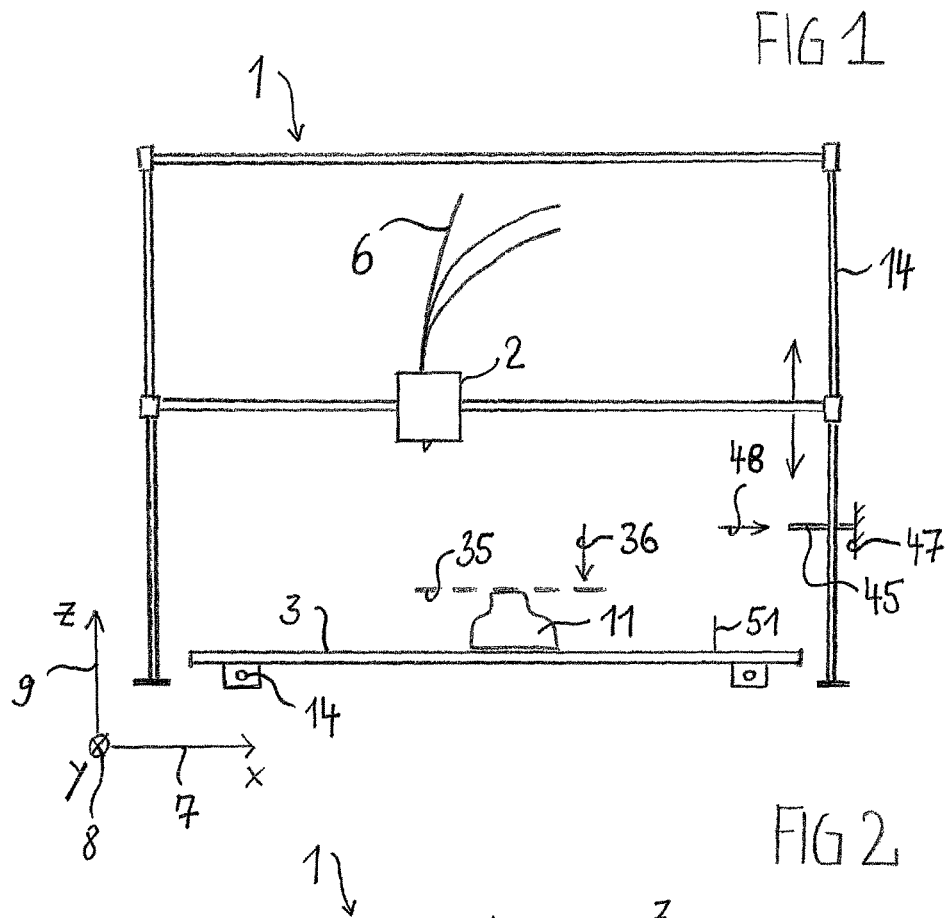
FIG. 1 is a side view of a 3D printer.

All the Figures show the invention not true to scale, merely schematically, and only with its essential constituents. Identical reference characters correspond to elements having an identical or comparable function.

Figure 2:
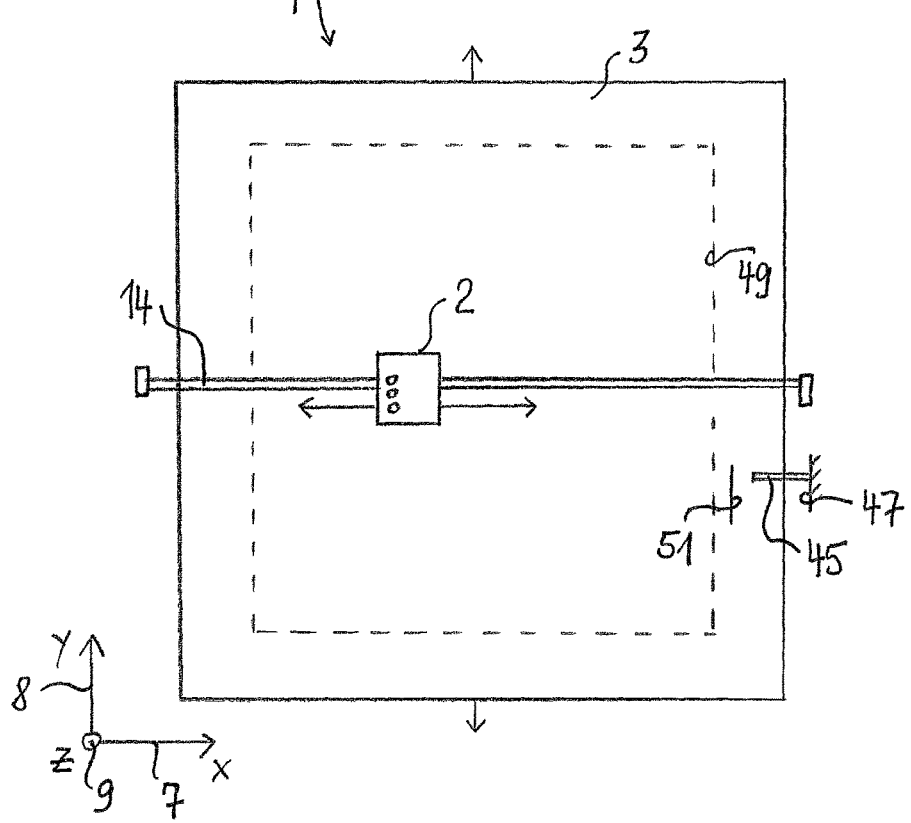
FIG. 2 is a plan view of the 3D printer of FIG. 1.
Figure 3:
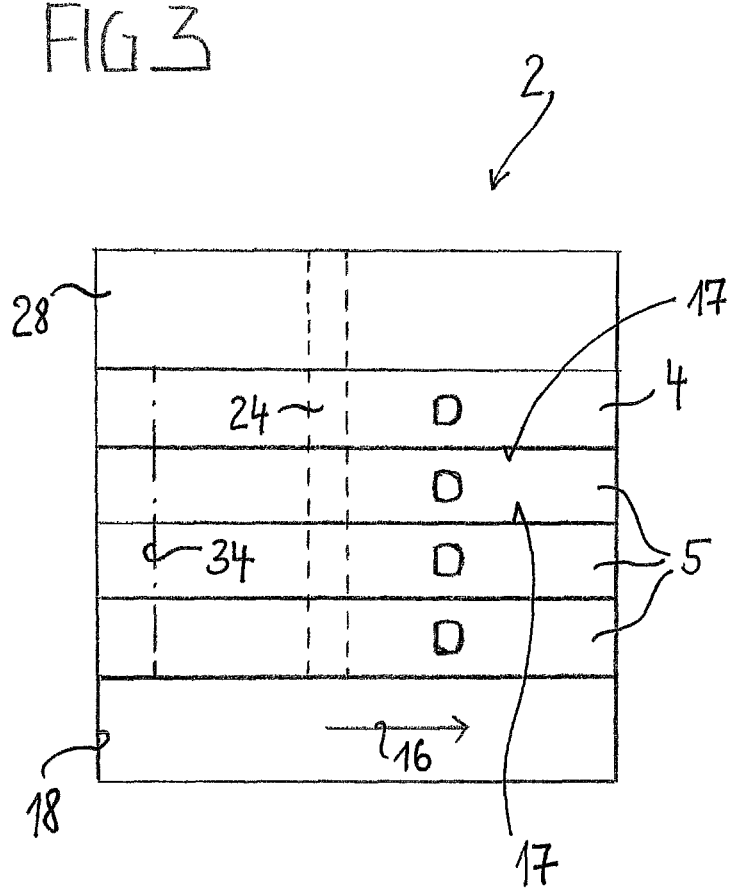
FIG. 3 is a plan view of a tool head having four extrusion tools.

As depicted in FIGS. 1 and 2, 3D printer 1 comprises a tool head 2 and a build platform 3. As explained in detail below, tool head 2 encompasses multiple extruder tools 4, 5 (see also FIG. 3). With the aid of extruder tools 4, 5, different modeling material 6 is successively liquefied by heating, and is deposited in layers on build platform 3. Tool head 2 is raised in a Z direction 9 in accordance with the applied layer thickness. Once modeling material 6 has been extruded, it cools and solidifies. The individual layers join together to yield the desired three-dimensional object 11.

Liquefaction and extrusion of modeling material 6 take place in extrusion units 12 of extruder tools 4, 5. Extrusion units 12 possess for this purpose either a separate liquefier for melting modeling material 6 and an output nozzle for extruding modeling material 6, or a heated nozzle 13 that is embodied for both liquefaction and extrusion.

Tool head 2 is displaceable in Z direction 9 and in X direction 7. Build platform 3 is displaceable in Y direction 8. The structural and functional elements necessary for displacing tool head 2 and build platform 3 are illustrated only in part, for example including frame 14 on which tool head 2 is displaceably mounted. The electric motors, for example, that are used are not depicted, however.

The construction and manner of operation of a 3D printer 1 of this kind in general, and of an extruder tool 4, 5 in particular, are known to one skilled in the art, so that additional explanations thereof are not necessary at this juncture.

Figure 4:
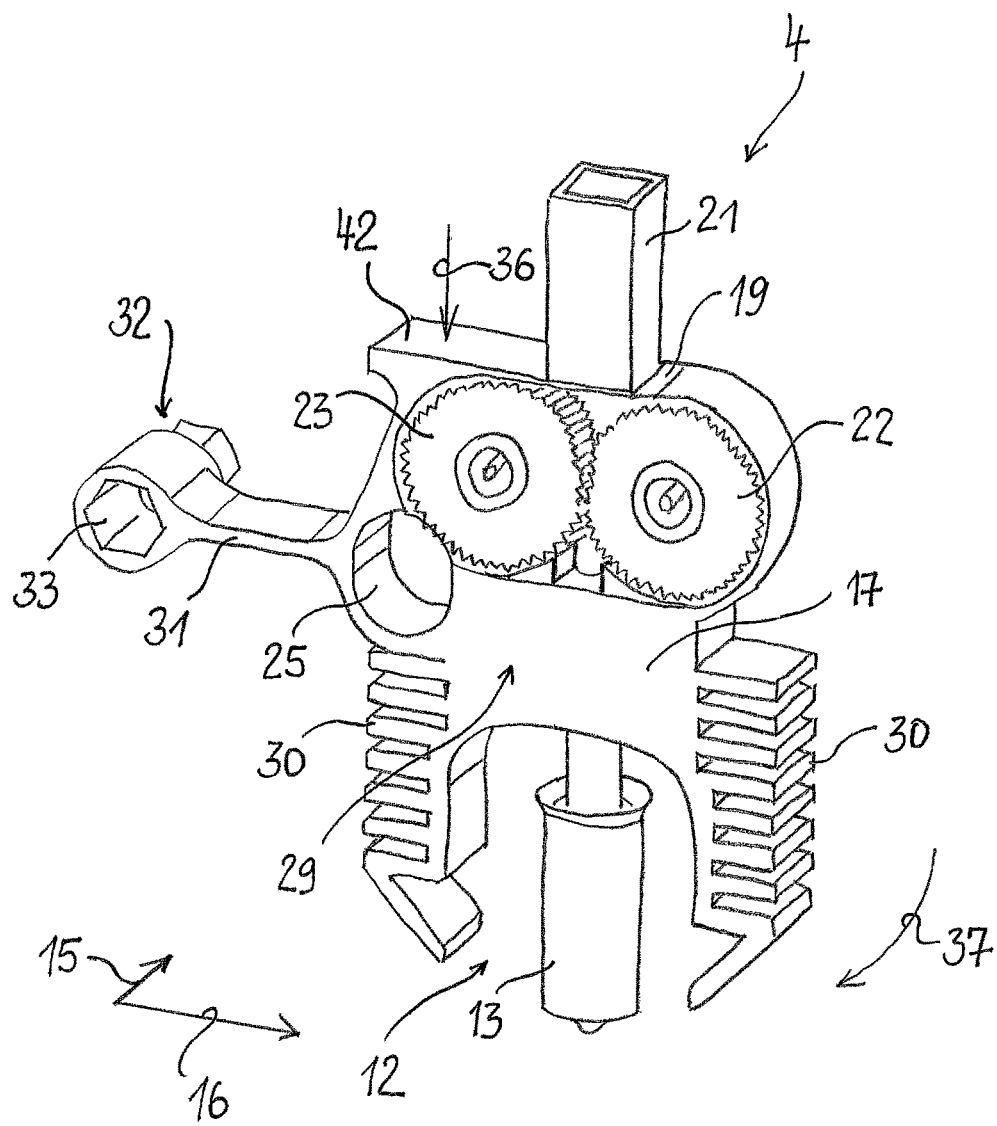
FIG. 4 is a perspective view of an extrusion tool.

An extruder tool 4, 5 that can be used in a tool head 2 of 3D printer 1 is illustrated in FIG. 4. It has a configuration that is comparatively narrow in a transverse direction, so that it can be installed together with further extruder tools 4, 5, abutting against one another at lateral surfaces 17, in housing 18 of tool head 2 (see FIG. 3).

A delivery chute 21 is provided on upper side 19 of extruder tool 4, 5 for the delivery of modeling material 6. Two gears 22, 23 located opposite one another serve as feed elements in order to deliver modeling material 6 as uniformly as possible to heated nozzle 13, arranged therebelow, of the actual extrusion unit 12. Delivery is particularly precise when modeling filament 6 exhibits a surface profile, for example in the form of notches (not depicted) that interact positively with the teeth of filament drive system 22, 23. Conventional modeling material 6 having a smooth surface can, however, also be used. Heated nozzle 13 is flanked on both sides, in longitudinal direction 16 of extruder tool 4, 5, by cooling ribs 30.

A gear 23 is drivable via a drive shaft 24 of tool head 2. For this purpose, extruder tools 4, 5 are arranged in tool head 2 in such a way that the shared drive shaft 24 passes in transverse direction 15 through all extruder tools 4, 5. Each extruder tool 4, 5 comprises for this purpose a continuous receiving opening 25, extending in transverse direction 15, for drive shaft 24. Receiving opening 25 is sufficiently larger than the diameter of drive shaft 24 that extruder tool 4, 5, together with gear 23 that is to be driven, is movable relative to drive shaft 24 (which is connected in stationary fashion to housing 18 of tool head 2) with no contact between drive shaft 24 and the edge of receiving opening 25. Drive shaft 24 has teeth or the like (not depicted) suitable for establishing the operative connection with gear 23 so that drive shaft 24 and gear 23 mesh with one another when the operative connection is established.

In order to select a specific extruder tool 4 from the plurality of extruder tools 4, 5 present in tool head 2, an operative connection is established, with the aid of a selection device 26 described in more detail below, between one of extruder tools 4, more precisely a drive element of that extruder tool 4, namely gear 23, on the one hand, and drive system 27, more precisely drive shaft 24 driven by an electric motor 28, on the other hand.

In order to establish the operative connection, the selected extruder tool 4 whose gear 23 is to be brought into an operative connection with drive shaft 24 (arranged all the way on the left in FIG. 5 and indicated only with dashed lines) is transferred from an idle position in which extruder tool 4 is not operatively connected to drive system 27 into a working position in which extruder too 4 is operatively connected to drive system 27, and for that purpose is moved relative to drive shaft 24. In order to move the selected extruder tool 4 relative to drive shaft 24, selection device 26 is embodied to establish the operative connection between that extruder tool 4 and drive system 27.

Figure 5:
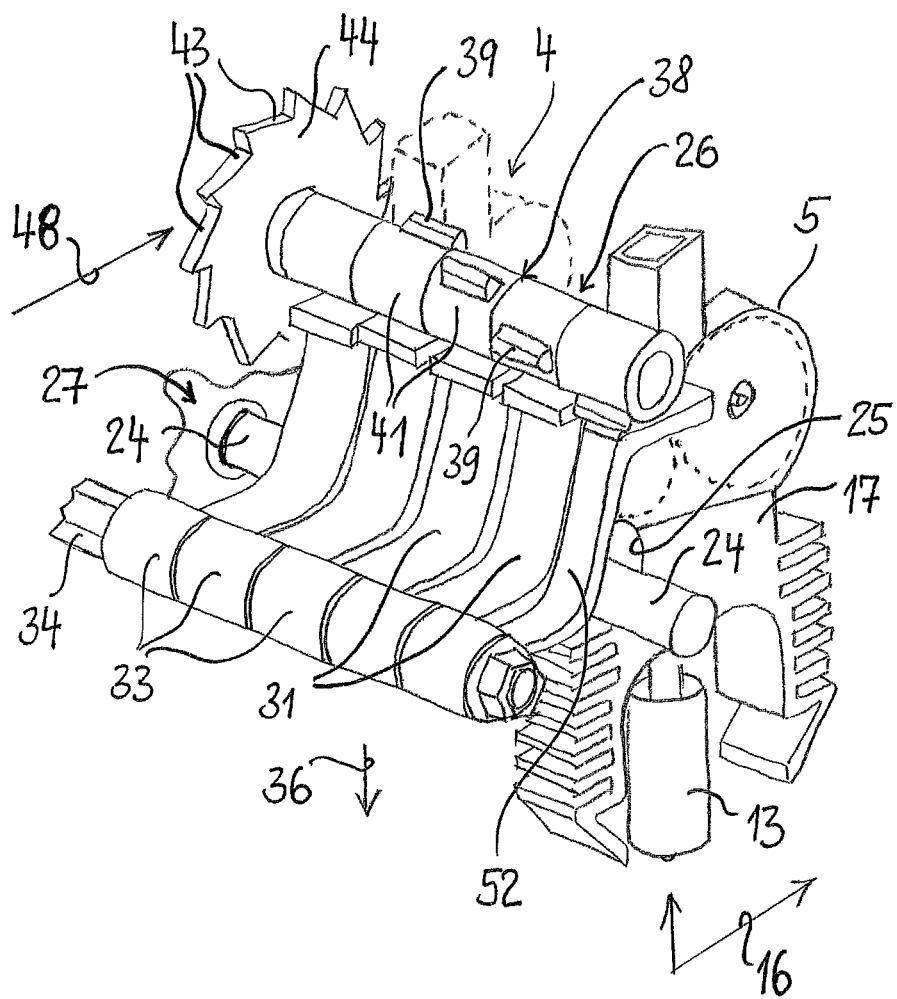
FIG. 5 is a partial perspective view of individual elements of the tool head.

As illustrated in FIGS. 4 and 5, the selected extruder tool 4 possesses a flexural arm 31, connected to basic housing 29 of extruder tool 4, that extends in longitudinal tool direction 16. At free end 32 of flexural arm 31, a suitable connecting element 33 is provided for establishing a nonrotatable connection to a stationary flexural shaft 34 connected to housing 18 of tool head 2.

In their idle positions, extruder tools 4, 5 are positioned in tool head 2 in such a way that heated nozzles 13 are located above working plane 35 at a sufficient distance from build platform 3. When one of tools 4 is then impinged upon with a working pressure in working direction 36 toward build platform 3, an elastic flexural deformation of flexural arm 31 secured on flexural shaft 34 then occurs in such a way that extrusion tool 4 moves, with a pivoting motion 37, out of its idle position into a working position. The working position is that position of extruder tool 4 in which both extrusion unit 12 and drive element 23 are in their working position. This is the case when extruder unit 12, in the present exemplifying embodiment especially heated nozzle 13, is arranged in the prescribed position with respect to build platform 3, and drive element, here gear 23, is arranged with respect to drive shaft 24 in such a way that drive shaft 24 and gear 23 engage into one another and enable delivery of modeling material 6 to heated nozzle 13. In FIG. 5, extruder tool 4 arranged all the way on the left is deflected a few millimeters out of its idle position, toward build platform 3, into its working position, while the three extruder tools 5 located to the right thereof are in their idle position.

In order to select the desired extruder tool 4, 5, selection device 26 encompasses a rotatable camshaft 38 attached in stationary fashion on housing 18 of tool head 2 and having a number of control cams 39. Camshaft 38 is assembled from individual camshaft elements 41, each camshaft element 41 carrying a control cam 39. The sequence of camshaft elements 41, and thus the manner in which control is applied to the individual extruder tools 4, 5, is thus modifiable depending on the requirements of object 11 that is to be manufactured.

Control cams 39 are arranged on camshaft 38 in a manner offset by defined angles. Upon a rotation of camshaft through a defined rotation angle, a respective one of control cams 39 impinges upon an abutment surface 42, provided therefor, on upper side 19 of one of extruder tools 4, 5, and transfers that extruder tool 4, 5 with a pivoting motion 37 from its idle position into its working position.

Provided at one end of camshaft 38 is a selector wheel 44 connected to camshaft 38 and equipped with notches 43. Selector wheel 44 can be actuated by means of an actuation pin 45.

With the aid of a tool head drive system (not illustrated), tool head 2 is displaced against a stationary actuation pin 45, mounted e.g. on a housing part or frame part 47 of 3D printer 1, in such a way that actuation pin 45 engages into one of notches 43 of selector wheel 44 and, by means of a defined engagement motion in actuation direction 48, rotates camshaft 38 through a defined rotation angle. In some circumstances multiple engagement motions, i.e. repeated displacement of tool head 2 in actuation direction 48 against actuation pin 45, are necessary in order to bring about the desired position of control cams 39 that effects the desired selection of an extruder tool 4, 5.

When a change of extruder tools 4, 5 is made, the impingement by the relevant control cam 39 on extruder tool 4 that was hitherto operatively connected to the drive shaft ends, and an automatic return of that extruder tool 4 into its idle position occurs due to the elasticity of flexural arm 31 occurs, while another extruder tool 5 is transferred into the working position thanks to impingement by the corresponding control cam 39.

Once the desired extruder tool 4, 5 has been selected, advantageously extruder unit 12 is firstly cleaned, preferably by the fact that, preferably still in the region of actuation pin 45, the remaining modeling material 6 is pushed out of heated nozzle 13, and upon retraction back into working region 49 it is wiped off on a wiper panel 51 or the like provided for that purpose on build platform 3.

In the example shown here, four extruder tools 4, 5 are provided in tool head 2. It is also possible, however, to utilize two extruder tools 4, 5 and two milling tools (not illustrated) for material processing of the layered construction, and so forth. Further driven or non-driven tools can also be used in addition to extruder tools 4, 5 shown here. FIG. 5, for example, already shows all the way on the right an additional flexural arm 52 on which, for example, a measurement sensor for ascertaining the zero position of tool head 2 can be attached (not depicted).

In other embodiments 3D printer 1 can also comprise, instead of one tool head 2, multiple tool heads 2 each having multiple extruder tools 4, 5, so that object 11 is built using two or more extrusion units 12 working concurrently.

3D printer 1 encompasses a data processing unit (not illustrated) embodied to carry out all or selected method steps in connection with the operation of 3D printer 1, in particular in connection with the application of control to drive systems 27, 28, etc. that are depicted and not depicted. The data processing unit is realized either in the form of computer hardware or in the form of computer software or in a combination of hardware and software. If the invention is realized in the form of software, i.e. as a computer program product, all the functions described are implemented by way of computer program instructions when the computer program is executed on a computer having a processor.

All the features presented in the description, in the claims that follow, and in the drawings can be essential to the invention both individually and in any combination with one another.

LIST OF REFERENCE CHARACTERS

1 3D printer
2 Tool head
3 Build platform
4 Selected extruder tool
5 Extruder tool
6 Modeling material 7 X direction
8 Y direction
9 Z direction
10 (unassigned)
11 Object
12 Extrusion unit
13 Heated nozzle
14 Frame
15 Transverse direction
16 Longitudinal direction
17 Lateral surface
18 Housing
19 Upper side
20 (unassigned)
21 Delivery chute
22 Gear
23 Drivable gear
24 Drive shaft
25 Receiving opening
26 Selection device
27 Drive system
28 Electric motor
29 Basic housing
30 Cooling rib
31 Flexural arm
32 Free end
33 Connecting element
34 Flexural shaft
35 Working plane
36 Working direction
37 Pivoting motion
38 Camshaft
39 Control cam
40 (unassigned)
41 Camshaft element
42 Abutment surface
43 Notch
44 Selector wheel
45 Actuation pin
46 (unassigned)
47 Frame part
48 Actuation direction
49 Working region
50 (unassigned)
51 Wiper panel
52 Flexural arm

The invention claimed is:

1. A tool head for use in an apparatus for manufacturing a three-dimensional object by melt layering, the tool head comprising:
at least two drivable tools, at least one of said at least two drivable tools being an extruder tool for melting a modeling material suitable for building the object in layers;
an extrusion unit for extruding the modeling material;
a drive system shared by said at least two drivable tools, said drive system causing said at least one extruder tool to feed the modeling material into said extrusion unit and said drive system including a drive shaft;
said at least one drivable tool being movable relative to said drive shaft and being brought into said operative connection with said drive system by being transferred from an idle position in which said at least one drivable tool is not operatively connected to said drive system into a working position in which said at least one drivable tool is operatively connected to said drive system; and
a selection device for establishing an operative connection between said drive system and at least one drivable tool selected from said at least two drivable tools, said selection device being configured to move said at least one drivable tool relative to said drive shaft to establish said operative connection between said at least one drivable tool and said drive system, and said selection device including a rotatable camshaft having a plurality of control cams, each of said control cams serving, upon a rotation of said camshaft through a defined rotation angle, to transfer said at least one drivable tool from said idle position into said working position or from said working position into said idle position.

2. The tool head according to claim 1, wherein said selection device is configured to establish said operative connection individually for each of said at least two drivable tools.

3. The tool head according to claim 1, wherein said selection device is configured to establish said operative connection simultaneously for a plurality of said drivable tools.

4. The tool head according to claim 1, which further comprises a motor for driving said drive shaft.

5. The tool head according to claim 1, wherein said at least one drivable tool is at least one of pivotable around a pivot shaft or deflectable by elastic flexural deformation, for transferring said least one drivable tool from said idle position into said working position or from said working position into said idle position.

6. The tool head according to claim 1, which further comprises:
a selector wheel connected to said camshaft and having indentations; and
an actuation element for actuating said selector wheel with a defined engaging motion of said actuation element to cause a rotation of said camshaft through a defined rotation angle in order to perform a selection of one or more of said at least one drivable tool.

7. The tool head according to claim 1, wherein said selection device is configured to transfer a tool not drivable by said drive system or a sensor from an idle position into a working position or from a working position into an idle position, simultaneously with or independently of said operative connection to be established between said at least one drivable tool and said drive system.

8. An apparatus for manufacturing a three-dimensional object by melt layering, the apparatus comprising:
a tool head including at least two drivable tools, at least one of said at least two drivable tools being an extruder tool for melting a modeling material suitable for building the object in layers, an extrusion unit for extruding the modeling material, a drive system shared by said at least two drivable tools, said drive system causing said at least one extruder tool to feed the modeling material into said extrusion unit, and a selection device for establishing an operative connection between said drive system and at least one drivable tool selected from said at least two drivable tools;
a rotatable camshaft having a plurality of control cams, each of said control cams serving, upon a rotation of said camshaft through a defined rotation angle, to transfer said at least one drivable tool from an idle position into a working position or from said working position into said idle position;
a selector wheel connected to said camshaft and having indentations;

an actuation element for actuating said selector wheel; and a tool head drive system for moving said tool head against said actuation element or for moving said actuation element against said tool head, to cause said actuation element to engage into one of said indentations of said selector wheel and to rotate said camshaft through a defined rotation angle by a defined engagement motion.

* * * * *